March 6, 1962 D. H. HOWRY 3,023,611
ULTRASONIC METHOD AND APPARATUS FOR INVESTIGATING
THE INTERIOR STRUCTURE OF SOLID BODIES
Filed March 19, 1956 3 Sheets-Sheet 1

INVENTOR.
DOUGLASS H. HOWRY
BY
ATTORNEYS

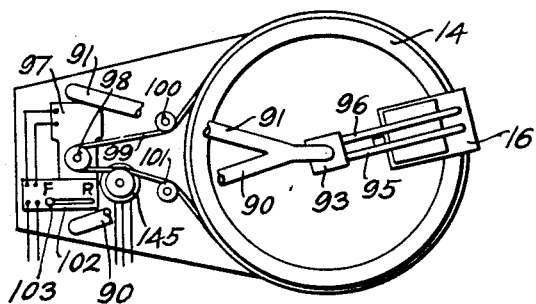

March 6, 1962 D. H. HOWRY 3,023,611
ULTRASONIC METHOD AND APPARATUS FOR INVESTIGATING
THE INTERIOR STRUCTURE OF SOLID BODIES
Filed March 19, 1956 3 Sheets-Sheet 3

INVENTOR.
DOUGLASS H. HOWRY
BY
ATTORNEYS

United States Patent Office 3,023,611
Patented Mar. 6, 1962

3,023,611
ULTRASONIC METHOD AND APPARATUS FOR INVESTIGATING THE INTERIOR STRUCTURE OF SOLID BODIES
Douglass H. Howry, Denver, Colo.
(436 Christmas Tree Drive, Boulder, Colo.)
Filed Mar. 19, 1956, Ser. No. 572,587
12 Claims. (Cl. 73—67.8)

My invention relates to ultrasonic method and apparatus for examining the interior structure of solid bodies and particularly to an improved apparatus for producing pictorial representations of cross sections of such bodies. The present invention is an improvement on the invention disclosed and claimed in my co-pending application Serial No. 382,547, filed September 28, 1953, which was issued as Patent No. 2,833,999 on May 6, 1958.

In the course of investigation of different types of bodies by the apparatus of my above-mentioned application it was found that the configuration and interior structure of some bodies was such that inadequate or indefinite results were secured; for example, spurious images may be formed and give the appearance of structural features which do not exist. In order to overcome these difficulties the objects under examination were examined from various angles so that a plurality of different views were obtained in which spurious images would not appear in the same positions. While this multiple view procedure is suitable for many investigations it is not satisfactory for all types of bodies of matter. Accordingly, it is an object of my present invention to provide an improved ultrasonic apparatus for investigating the interior structure of bodies of matter and which provides greater accuracy in the determination of the physical characteristics of the interiors of such bodies.

It is another object to produce an apparatus employing ultrasonic waves for the investigation of the internal structure of bodies of matter including an improved arrangement for securing an accurate pictorial representation of a cross section of a solid body.

Briefly, in carrying out the objects of the invention in one embodiment thereof, a tank is provided in which a body to be examined is submerged in liquid and an electroacoustical transducer is mounted on the tank in a position to direct a concentrated beam of ultrasonic wave energy toward the body to be examined, and the beam is moved back and forth across the body at the same time that the transducer is rotated about the body. Echoes returning from the body are amplified and utilized to control the intensity of the beam of a cathode ray tube having a long persistence fluorescent screen. The deflection yoke of the tube is rotated in synchronism with the transducer to maintain the image on the screen stationary regardless of the relative angular positions of the body and the transducer. In another form, a camera is employed with a cathode ray tube having a stationary deflecting yoke and a short persistence screen and the camera is moved in synchronism with the transducer rotation to secure a stationary image on the camera plate.

The novel features which characterize my invention are set forth with particularity in the appended claims. The invention itself, however, both as to its organization and method of operation together with further objects and advantages thereof may best be understood by reference to the following description taken in connection with the accompanying drawing in which:

FIG. 7 is a plan view of scanning equipment of FIG. 1;

FIG. 8 is a side elevation view of the cathode ray cabinet of FIG. 1;

FIG. 9 is a schematic electric circuit diagram of the apparatus;

Figure 1:
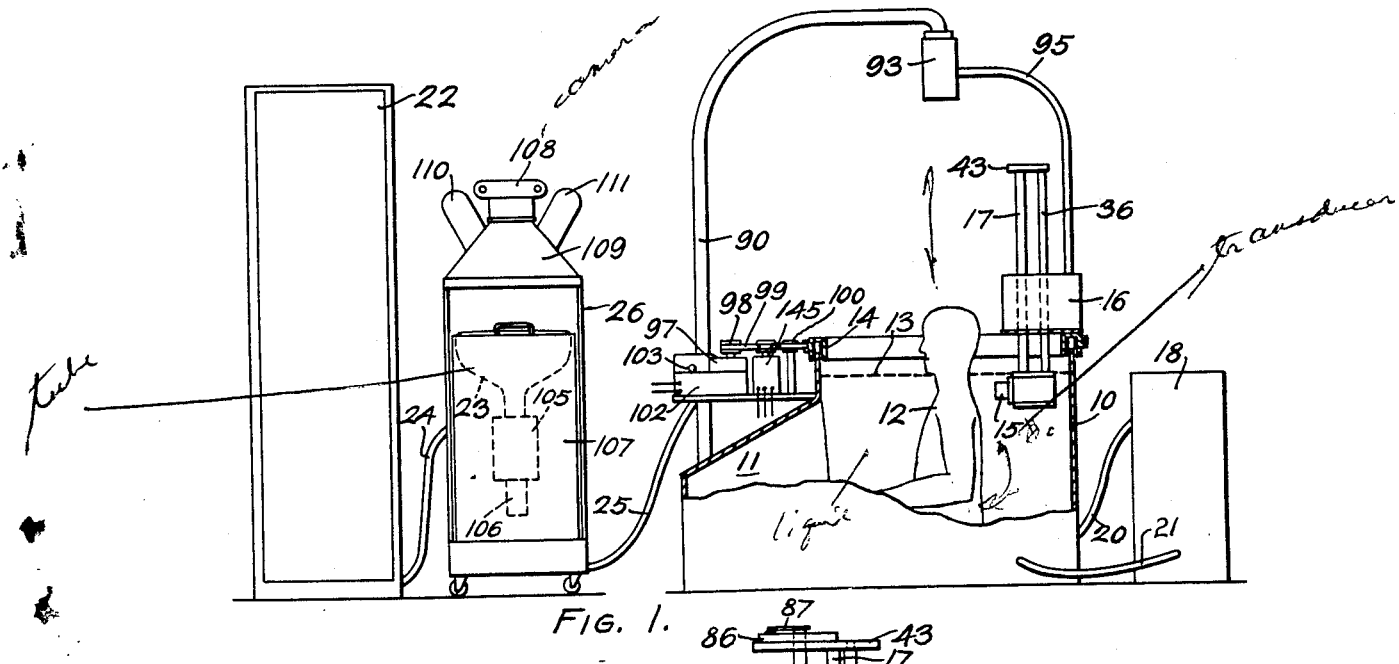
FIG. 1 is a diagrammatic elevation view of an ultrasonic inspection system embodying my invention.
Figure 2:
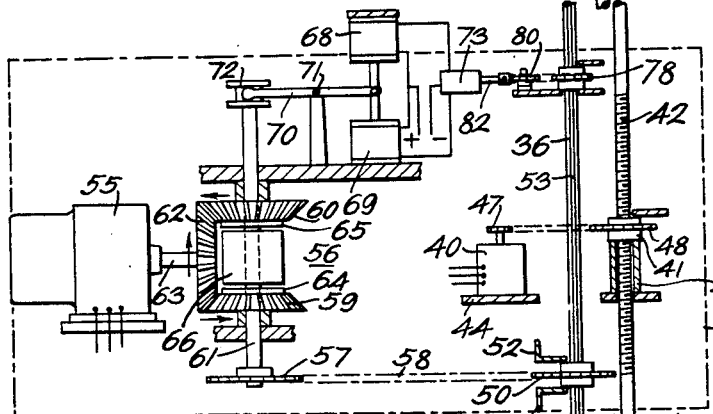
FIG. 2 is an enlarged view partly in section of a portion of the system of FIG. 1.
Figure 3:
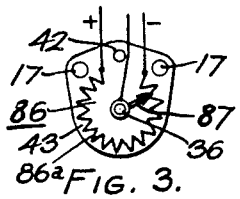
FIGS. 3, 4, 5 and 6 are detail views of portions of the apparatus of FIG. 2.

Referring now to the drawing, the system of FIG. 1 is an ultrasonic apparatus designed particularly for the visualization of the soft tissue structures of the human body. The equipment includes a cylindrical steel tank 10 having an outwardly extending portion 11 so that a patient 12 may sit in the tank with his feet in the portion 11. The tank is filled with water, salt solution or other suitable sound transmitting liquid to a desired level indicated at 13. A ring 14 of downwardly opening channel form is rotatably mounted on the top of the tank 10 and carries an electroacoustical transducer 15 and associated apparatus 16. The transducer 15 is of the general type disclosed in my copending application and may be adjusted vertically on rods 17; the transducer is illustrated in position for scanning a section of the neck of the patient.

The liquid in the tank is maintained at a desired uniform temperature by a liquid heating and circulating apparatus 18 connected to the tank by inlet and outlet hoses 20 and 21.

The echo signals resulting from scanning of the patient or test object in the tank are transmitted to a receiving and signal translation apparatus in a cabinet 22, and are then employed to modulate the electron beam of a cathode ray tube 23 so that the cross section of the patient's neck or other structure is portrayed on the screen of the tube. The power supply for the equipment is also included in the cabinet 22, suitable electrical connections being provided between the several components of the system as indicated by cable connections 24 and 25 connected to a cabinet 26 housing the tube 23 and between the cabinet and the control equipment on the tank.

The transducer 15 is mounted and controlled so that it scans the area in front of it with a back and forth movement which is at constant speed in both directions in the equipment illustrated. The details of the transducer and its control devices are diagrammatically illustrated in FIGS. 2 through 6. The transducer 15 is rigidly mounted on a crosshead 27 which in turn slides on upper and lower channel guides 28 and 29 attached to upper and lower support members 30 and 31, respectively. The slide 27 is driven back and forth at uniform speed by a chain 32 engaging sprockets 33, 34 and 35 mounted on vertical shafts; the shaft for the sprocket 35 indicated at 36 is the driving shaft and extends upwardly parallel to the guide rods 17; the sprockets 33 and 34 are mounted on stub shafts 37 and 38 extending between the support members 30 and 31. The transducer may be raised and lowered by operation of a motor 40 driving an internally threaded sleeve 41 which engages a threaded rod 42 secured between the plate 30 and a top plate 43. The rods 17 which acts as guides are also mounted between the plates 31 and 43 and are slidable with respect to the equipment 16, suitable slide bearings (not shown) being provided for this purpose. The motor 40 is rigidly mounted on a bracket 44 which is secured to the supporting structure of the equipment 16; the sleeve 41 is also held stationary with respect to the support, a portion of which is indicated at 46. The motor drives the sleeve through a chain which engages sprockets 47 and 48 on the motor shaft and sleeve, respectively. The shaft 36 is driven by a sprocket 50 mounted near the lower side or base of the equipment 16 between retaining members or brackets 51 and 52, and provided with a keyway affording axial movement of the shaft and a spline 53 on the shaft which connects the shaft to be driven by the sprocket.

Figures 4, 5, 6:
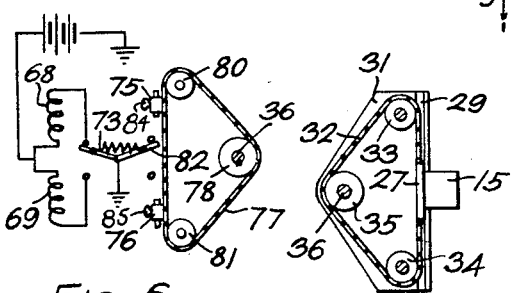

The shaft 36 is driven by a constant speed motor 55 through a two-way clutching mechanism 56, a sprocket 57, and a chain 58 engaging the sprocket 50. The clutching mechanism 56 comprises two bevel gears 59 and 60 freely rotatable on a shaft 61 and driven in opposite directions by a bevel gear 62 on the motor shaft 63. The gears 59 and 60 have disc clutches or facings 64 and 65 which are in position to be engaged alternatively by a cylindrical clutch member or drum 66. The drum 66 is moved positively and alternatively into engagement with the discs 64 and 65 by operation of a pair of solenoids 68 and 69 having their armatures pivotally connected to a rocker arm 70 pivoted on a post 71 and engaging a coupling 72 at the top of the shaft 61. The solenoids are energized alternatively in accordance with the position of the crosshead 27, the energization being reversed when the crosshead reaches each end of its path of travel. Because the motor 55 runs at constant speed, the crosshead is driven at the same speed in both directions of travel, and because of the rapid and positive clutching action, the speed is effectively constant over the full range of travel of the crosshead. The control for determining the length of stroke of the crosshead and for reversing its operation includes a single pole double throw snap acting switch 73 and an actuator mechanism 74. The mechanism 74 includes a pair of stops or switch actuators 75 and 76 adjustably positioned on a chain 77 which is driven by a sprocket 78, slidably mounted on the drive shaft 36. The chain passes over idler sprockets 80 and 81 and the stops 75 and 76 are attached to the straight portion of the chain between the idlers in positions for engaging an operating arm 82 of the switch 73. The chain thus moves in synchronism with the crosshead and by setting the positions of the stops 75 and 76 the extent of movement of the crosshead is controlled. The stops as shown in FIG. 6 are provided with set screws 84 and 85 for locking them in their selected positions on the chain 77. On top of the plate 43 and connected to be driven by the shaft 36, there is provided a potentiometer 86 comprising a resistance 86a and a contact arm 87 on the shaft 36 engaging the resistance. A direct current voltage is applied across the resistance as indicated and the portion of this voltage tapped by the arm 87 is an indication of the position of the crosshead and is employed for sweep control purposes as will be explained later.

The transducer 15 is thus mounted for straight line scanning movement from side to side and ultrasonic echoes returning from an object in the path of the transducer beam may be employed to produce an image of a cross section of the object on the screen of the cathode ray tube. It has been found, however, that for many uses the information obtained by this simple scanning is inadequate for analytical or clinical purposes. I have found that these disadvantages may be substantially eliminated in a wide range of applications by moving the scanning equipment and the body angularly with respect to one another in the plane of scanning while maintaining the back and forth scanning operation. This makes possible the production of a composite image of increased detail and with a minimum of spurious images or ghosts.

In the equipment illustrated, the ring 14 is mounted to rotate freely and concentrically around the top wall of the tank 10 so that it carries the transducer and equipment 16 around with it and can completely circle the patient or test object supported at the center of the tank. In order to provide the necessary electrical connections a pair of rigid tubular supporting posts 90 and 91 are provided which extend upwardly from the tank extension 11 and then bend over to a position above the center of the tank where they are joined together. A plurality of slip rings (not shown) for the electrical connections are mounted on the vertical center axis below the supports 90 and 91, and these are engaged by brushes (not shown) which are mounted within a housing 93 secured at the outer end of a pair of tubular supporting members 95 and 96, rigidly attached to the wall structure of the equipment unit 16. It will thus be apparent that the electrical connections will be maintained in a manner well known in the art while the transducer rotates about the tank.

In order to drive the transducer around the tank at uniform speed, a constant speed motor 97 is mounted on the tank extension 11 with its shaft vertical and connected to drive the ring 14 through a drive pulley 98 and a belt 99 which extends about the ring. Idler pulleys 100 and 101 are provided to hold the belt about a greater portion of the periphery of the ring. The motor may be driven in either direction by operation of a reversing control 102 which may be set to reverse the motor automatically to sweep the transducer back and forth over a selected angle if the full rotation is not desired; in addition, a hand control 103 of the control 102 may be employed for manual reversing of the motor.

In order to obtain a single composite image on the screen of the cathode ray tube, the direction of the deflection axis of the cathode ray beam must be changed in synchronism with the change in angular relationship of the transducer and object under observation. This is accomplished by providing the tube 23 with an electromagnetic deflecting yoke 105 and mounting the yoke so that it may be rotated about the neck 106 of the tube. This arrangement is indicated generally in FIGS. 1 and 8 diagrammatically and in detail in FIG. 9. As shown in FIGS. 1 and 8, the tube 23 is mounted in a sub-cabinet 107 which may be rotated about its lower front edge from the position of FIG. 1 to the position in FIG. 8 where the screen is in position for easy examination. The inner position of the tube is provided so that photographs may be made of the images on the screen by a camera 108 mounted above the inner position of the screen on a cone or hood 109; the screen may also be observed in this position both from the front above the sub-cabinet 107 and through two lateral shielded viewing openings 110 and 111. During the taking of a record or picture the camera shutter is kept open to expose the plate throughout the period of angular sweep required to obtain a picture of the signal images, the lens being stopped down as may be required for good results.

A further understanding of the operation of the system will be had from FIG. 9 which shows the electric circuit components and their arrangement; these components are known in the art and have been illustrated in block diagram form. The bursts of ultrasonic energy emitted from the transducer 15 are produced by impressing upon the crystal of the transducer an electrical impulse generated in a pulse generator 115. The pulses are produced at intervals determined by operation of a trigger generator 116 which produces trigger impulses at predetermined intervals. The interval between the trigger pulses is varied slightly and continuously by operation of a so-called wobbulator 117 which generates a continuous sine wave of relatively low frequency. The purpose of the wobbulator is to vary slightly the timing between the trigger pulses and prevent the setting up of images due to the recurrent return of echoes from long paths in the tank such that they appear during a subsequent gated interval. The pulse produced by the generator 115 is not a continuous wave but instead may be represented as a single cycle of a sine wave. A wave of this type cannot be characterized as having a single frequency but rather it is made up of a wide range of frequencies at various amplitudes which combine to produce the wave form desired. For this reason the components of the electronic circuit required for the transmission of the pulse must have a predetermined band pass characteristic. The returning echoes of the pulse are therefore amplified by a band pass amplifier 118 and are rectified by a detector 119 and then impressed upon a beam control electrode 120 of the tube 23 through a video amplifier 121. In order to prevent signals returning to the transducer 15 at periods other than the period of return of the echoes the cathode ray tube 23 is biased to a cut-off position except when the echoes are returning. This is accomplished by maintaining the cathode of the tube, indicated at 122, at a positive potential except when a negative square pulse from a beam gate control circuit 123 is impressed thereon. The gate control 123 and a sweep generator 124 are actuated to establish the cathode ray beam in the tube 23 and to sweep it vertically across the usual fluorescent screen on the inside front face 125 of the tube. A trigger delay circuit 126 is provided and produces a pulse of the same form as the trigger pulse but delayed an interval sufficient to insure energization of the cathode ray beam only after the transducer 15 has been deenergized and is producing no ultrasonic energy. This pulse initiates operation of the sweep generator 124 which is of the synchroscope type and is arranged to produce a single pulse of saw-tooth voltage and to impress it across a vertical deflection coil 127 incorporated in the magnetic deflection yoke 105 of the tube 23, the writing speed of the sweep being one-half that of sound in the body being examined to secure pictures of the same size as the object. The horizontal sweeping of the beam is accomplished by impressing across a horizontal coil 128 of the yoke 105 a voltage which is varied by operation of the potentiometer 86 in synchronism with the transducer 15.

Compensation for distortions or variations of the echo signal due to acoustic absorption is provided by operation of a gain compensator 130 so that issue of the same type will provide a signal of the same intensity regardless of its depth or position in the body under examination.

It will also be understood by those skilled in the art that when the velocities of sound through the liquid and through the body are substantially different suitable compensation may be applied to the sweep circuits of the cathode ray device so that distortion due to such differences in velocity can be substantially eliminated.

The coils 127 and 128 have been shown as single coils for diagrammatic illustration, and such deflecting unit would, as is well known, be a balanced pair of coils. The tube 23 is held stationary in any suitable support (not shown) this being the usual practice; the yoke 105 is rotatably mounted in a bearing on the support as indicated at 132. The yoke may be rotated about the neck 106 of the tube by operation of a geared selsyn motor 133 through sprocket wheels 134 and 135 connected by a chain 136. The electrical connections to the coils 127 and 128 are completed through their slip rings 137, 138 and 139 on the yoke housing and brushes 140, 141 and 142, respectively. The coil 127 is connected between slip rings 137 and 138, and the coil 128 between rings 137 and 139. The brush 140 is grounded and brushes 141 and 142 are connected respectively to the sweep generator 124 and the arm 87 of the potentiometer.

In order to drive the yoke 105 at the same speed as that at which the transducer is rotated about the object, a follow-up system is provided in which the selsyn motor 133 is connected to a selsyn generator 145 driven by the belt 99. The gearing ratios of the selsyn generator and motor drives are selected to give a one-to-one ratio of the revolutions of the transducer and the yoke so that they move in synchronism. The effect of this synchronized rotation of the yoke is to maintain the signal field in a stationary position on the fluorescent screen regardless of the angular movement of the transducer with respect to the object under examination.

Figure 10:
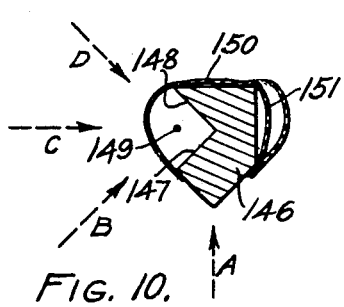
FIG. 10 is a sectional view of a test object.
Figure 11:
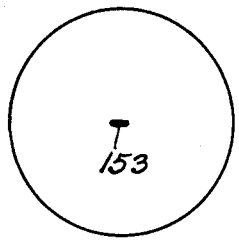
FIGS. 11 through 15 are successive views of the object of FIG. 10 as seen on the screen of the apparatus.

The purpose of providing the compound lateral and rotary scanning system described above and the mode of operation of the system will be further apparent from the following description in connection with FIGS. 10 through 20 illustrating the operation of the system when examining test objects. FIG. 10 is a sectional plan view of a test object in the plane of examination of the apparatus of FIG. 1. This object comprises a solid sound opaque metal block 146 which presents a plane figure made up of a square portion 147 and a right triangular portion 148. A metal rod 149 is mounted vertically in the V-shaped open area between the base of the triangle and one side of the square and this area is enclosed by a sheet 150 of cellulose plastic material which extends around the sides of the triangular portion lying close to the top side and being substantially spaced from the right hand side; a second piece 151 of the same plastic material is arranged between the right side of the triangle and the first piece. The plastic sheet 150 is cemented to the square piece, portion of the block leaving two sides of the square exposed. In order to test this object it was placed in the center of the tank 10 so that the plane of scanning of of the transducer would cut the illustrated section. The test object was of substantially the same cross section throughout its vertical dimension.

The object 146 was viewed from four positions of the transducer, the transducer being operated to sweep back and forth across the object but not being moved angularly. The four positions and directions of the ultrasonic energy paths are indicated by four arrows A, B, C, and D in FIG. 10 and the images received from these positions are shown in FIGS. 11, 12, 13 and 14, respectively.

When the object 146 was viewed from transducer position A a single short line segment 153 was the only strong image as shown in FIG. 10. Thus the ultrasonic energy echoes from all parts of the object except the front edge of the square section were lost; the echoes of the ultrasonic beam striking the oblique surfaces were reflected at angles such that they did not return to the transducer. It has also been found that the image of any rod or a corner such as that shown is translated as a line segment when the simple lateral sweep of the ultrasonic beam is employed.

Figure 12:
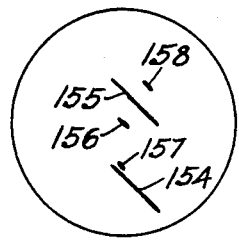

When the transducer is in position B, the image of FIG. 12 is obtained, which comprises two lines 154 and 155 produced by the bases of the square and triangle, a short segment 156 produced by the rod 149, and two spurious images or "spooks" 157 and 158.

Figure 13:
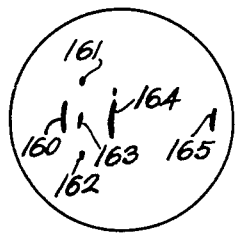

On turning to position C, the front of the plastic sheet 150 appears in FIG. 13 as a curved line 160, the corners appear as short lines 161 and 162, the rod 149 as a line 163 and the bottom or corner of the V-shaped notch as a line 164; a "spook" 165 also appears at the right.

Figure 14:
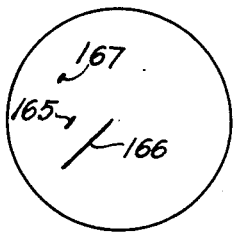
Figure 15:
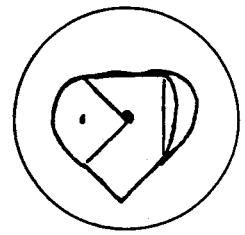

Turning now to FIG. 14 which represents the image formed by scanning from position D, it will be seen that only the rod 149, the upper side of the square 147 and the corner of the triangle are to be seen, these being the images indicated at 165, 166 and 167, respectively.

Markedly different and incomplete signal pictures are thus secured from the same object when viewed from different positions. The test object of FIG. 10 when viewed with the circular compound scanning wherein the transducer rotates completely around the object while sweeping back and forth horizontally forms the composite image shown in FIG. 15. In this image the wire 149 and the outline of the block 146 are clear and in addition the sheets of plastic 150 and 151 are also clearly formed. The heavy image area at the bottom of the V-shaped notch results from the high-intensity echoes received from this type of configuration. The "spooks" or spurious images disappear in the composite image because they are not repeated in the same position and hence the images are not of sufficient intensity to be retained.

The images as shown may be held on a long persistence screen or preferably may be photographed to secure the composite effect resulting from the superimposing of the images from the successive positions of the transducer as it moves around the tank. It will be understood that the back and forth movement of the transducer is rapid as compared with the rate of movement of the transducer around the tank. For example, the transducer may move back and forth at a rate of 240 strokes per minute while it moves around the tank at one revolution per minute.

Figure 17:
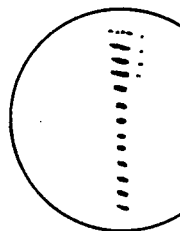
FIGS. 17 through 20 are successive views of the object of FIG. 16.
Figure 18:
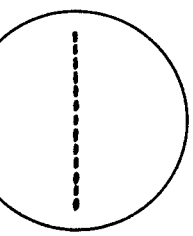
Figure 19:
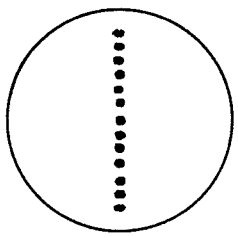
Figure 20:
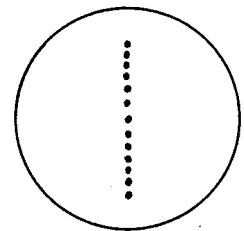
Figure 16:
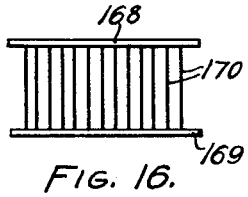
FIG. 16 is an elevation view of a wire grid object.

The manner in which a superior pictorial image may be secured by employing the camera 108 is illustrated in FIGS. 16 through 20. The test object shown in FIG. 16 is a simple wire grid comprising two spaced longitudinal members 168 and 169 connected by a plurality of parallel cross wires 170. FIG. 17 shows the image formed by simple back and forth scanning from the direction of the small arrow parallel to the plane of the grid, a line of substantially parallel line segments being formed. In FIG. 18 the grid has been scanned with the ultrasonic beam normal to the grid face as indicated by the small arrow at the left of the figure; in this view a plurality of short line segments are formed in alignment. If now the circular compound scanning method is employed, the distortion of the images may be overcome. FIG. 19 shows these images as they appear on the fluorescent screen—a line of dots, which, however, appear as substantially larger than the cross sections of the wires 170 of the grid. By employing the camera 108 and stopping the lens down, an image as shown in FIG. 20 may be secured which is a substantially true cross section of the grid. Thus the concentration of the signals which repeat in the same position as the transducer rotates makes it possible to minimize the fringe images as well as "spooks," the true image repeated in the same position being reproduced in correct size and form. The stopping down of the camera lens thus makes possible a high degree of resolution of the signal pattern.

Many objects are such that it is not necessary or desirable to employ 360 degree rotation of the transducer equipment and it is for this reason that the combined automatic and manual rotary sweep control 102 is provided. This makes possible the angular or circular movement of the transducer back and forth over a selected sector, so that the equipment may be employed, for example, to procure a cross section picture of only a portion of a patient's body.

It will also be apparent that the relative angular movement of the object under examination with respect to the ultrasonic beam path may be secured by holding the transducer stationary and rotating the object, instead of moving the transducer around the object.

Figure 21:
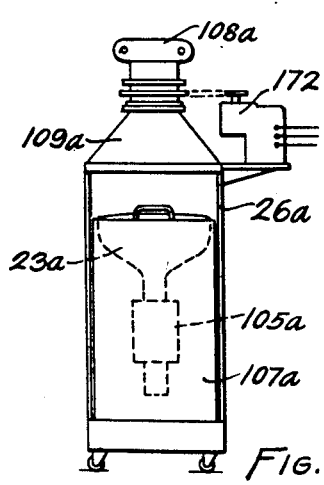
FIG. 21 is a side elevation view of a modified form of cathode ray display apparatus.

FIG. 21 shows a modified form of the signal portraying equipment which is similar to that of FIG. 1 and the same numerals with the suffix letter "a" have been employed to designate corresponding parts. This equipment may be employed with the scanning and circuit apparatus of FIG. 1 and differs from the corresponding equipment of FIG. 1 in that the camera 108a is rotated by a selsyn motor 172 which is connected to the selsyn 145 to drive the camera in synchronism with the transducer assembly in the same manner as the motor 133 drives the deflecting yoke 105a in the arrangement of FIG. 9. It will readily be apparent that the effect is the same as far as the taking of photographs is concerned; however, the image on the screen of the tube 23a would not be stationary and would not present an image for visual inspection. The tube 23a is provided with a fluorescent screen of the short persistence type so that a minimum of blurring effect results as the images appear in their successive rotated positions, and so that the camera follows the rotation of the signal images and in effect records successive pictures.

Figure 22:
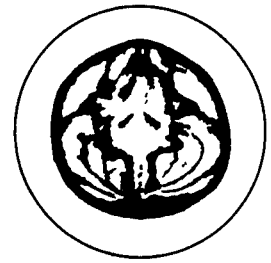
FIG. 22 is a sectional view of a human neck as viewed by the apparatus of the invention.

Either embodiment of the invention may be employed to secure pictures representing the cross section of parts of the human body and the composite image formed by the apparatus of this invention provides useful clinical information. By way of example, FIG. 22 shows a sectional view of a human neck made by this apparatus and serves to indicate the usefulness of the equipment in the medical field; in this figure the more dense tissues are shown black—the reverse of the light signals on the fluorescent screen.

While I have illustrated and described a specific form of apparatus embodying my invention various other arrangements and applications will occur to those skilled in the art. I do not, therefore, desire my invention to be limited to the details of construction and specific arrangements disclosed and I intend, by the appended claims, to cover all modifications which fall within the spirit and scope of my invention.

I claim:

1. An apparatus for the examination of physical characteristics of the interior of an enclosed body of matter comprising electroacoustical transducer means, means for maintaining a body of liquid between said transducer means and the body to be examined, electric pulse wave generator means connected to excite said transducer means for producing a series of ultrasonic wave signals, means for directing said signals in a concentrated beam through the liquid and into the body to be examined, means connected to said transducer means for receiving echoes of said signals reflected from the body under examination, means for sweeping the signal beam laterally back and forth across a portion of the body whereby successive signals of said series penetrate a succession of adjacent paths through the body, an electron discharge device having a fluorescent screen and means for projecting a beam of cathode rays onto said screen, means for deflecting said cathode ray beam across said screen along one axis at a rate proportional to the rate of production of said signals, means for deflecting said cathode ray beam along an axis transverse to said first axis at the rate of movement of said signal beam sweeping means, means for varying the intensity of said cathode ray beam in accordance with the intensity of the echoes received from said body whereby images corresponding to said echoes are produced on said screen, means for continuously changing the relative angular positions of said body with respect to said transducer means in the sweeping plane of said signal beam and at a rate substantially less than the rate of movement of said lateral sweeping means, and means synchronized with the changes of the relative angular positions of said transducer and body and arranged to utilize the successive images formed on said screen for producing a composite image of the cross section of the body to be examined in said sweeping plane.

2. An apparatus for the examination of the interior of an enclosed body of matter as set forth in claim 1 wherein said last mentioned means comprises a motor and a driving mechanism for moving said deflecting means angularly about the beam axis of said tube in synchronism with the changes in relative angular position of said transducer and body whereby said signals are portrayed with respect to the same axes of said screen regardless of the position of said deflecting means.

3. An apparatus for the examination of the interior of an enclosed body of matter as set forth in claim 1 wherein said fluorescent screen is of the short persistence type and wherein said last mentioned means comprises a photographic camera mounted in front of said screen for focusing thereon and motor drive means for rotating said camera about the central axis of said tube in synchronism with the changes in angular position of said transducer and body whereby successive signals portrayed on said screen appear along the same axis in said camera regardless of the positions of the images of said signals on said screen.

4. An apparatus for the examination of the interior of an enclosed body of matter as set forth in claim 1 wherein said means for sweeping the signal beam includes means for driving said transducer back and forth in a straight line path at constant speed.

5. An apparatus for the examination of the interior of an enclosed body of matter as set forth in claim 1 wherein said means for maintaining liquid between the transducer and the body to be examined comprises a tank for submerging the body to be examined in liquid, and wherein said means for changing the angular positions of the body and transducer comprises means for effecting relative rotation of the body through 360° with respect to the beam axis of the transducer.

6. An apparatus for the examination of the interior of an enclosed body of matter as set forth in claim 1 wherein said means for maintaining liquid between the transducer and the body to be examined comprises a tank for submerging the body to be examined in liquid and wherein said means for changing the angular positions of said body and transducer comprises a horizontal circular supporting ring rotatably mounted on the upper portion of said tank and having said transducer suspended therefrom for rotation about the central zone of said tank.

7. An apparatus for the examination of the interior of an enclosed body of matter as set forth in claim 1 wherein said means for maintaining liquid between the transducer and the body to be examined comprises a tank for submerging the body to be examined in liquid and wherein said means for changing the angular positions of said body and transducer comprises a horizontal circular supporting ring rotatably mounted on the upper portion of said tank and having said transducer suspended therefrom for rotation about the central zone of said tank and including means for rotating said ring back and forth over a selected sector of said tank.

8. In an ultrasonic apparatus for examining the physical characteristics of the interior of bodies of matter, means including an electroacoustic transducer for generating a concentrated beam of ultrasonic wave energy, means for positioning an object to be examined in the path of the beam, means for maintaining the object and the transducer immersed in a body of liquid, means for directing the beam toward the object to be examined, means arranged to move the transducer at a relatively rapid rate back and forth along a line transverse to the beam path for sweeping the object with the beam penetrating it along successive adjacent parallel paths, means for affording relative rotation of the object with respect to the transducer, driving means cooperating with said last mentioned means for continuously changing the angular position of the object with respect to said transducer to effect compound scanning of the object whereby said transducer may be operated to sweep said beam through the object over a predetermined field thereof while the angular relation of the object and ultrasonic beam is changed continuously by said driving means, means connected to said generating means for receiving echoes from ultrasonic energy reflecting parts of the object within said field, means utilizing said received echoes for producing a representation of the respective parts of the object in their relative positions, and means synchronized with the changes in the relative angular positions of the object and said transducer for coordinating the representations of the parts of the object in all said angular positions whereby the successive representations may be superposed to produce a composite representation of the object in said field.

9. In an ultrasonic apparatus for the examination of the interior of an enclosed body of matter, means including an electroacoustic transducer for producing a concentrated beam of ultrasonic energy waves, means for directing the beam of energy toward an object to be examined, means for moving said transducer at a relatively rapid rate to sweep the beam laterally across an area in a predetermined plane for scanning a section of the object, means for changing at a relatively slow rate the relative positions in said plane of the surface of the object and said transducer whereby the object is scanned rapidly by lateral movement of the transducer beam through the object from progressively different positions of the transducer with respect to the object to effect compound scanning thereof, means connected to said beam producing means for receiving echoes from ultrasonic energy reflecting parts of the object within said area, means utilizing said received echoes for producing a representation of the respective parts of the object in their relative positions, and means synchronized with the changes in the relative positions of the object and said transducer for coordinating the representations of the parts of the object in all said positions whereby the successive representations may be superposed to produce a composite representation of the object in said area.

10. In an ultrasonic apparatus for the examination of the interior of an enclosed body of matter, means for holding an object to be examined in a body of liquid, electroacoustic transducer means for projecting ultrasonic energy in a beam configuration through the liquid toward the object to be examined, means for operating said transducer means to rapidly and repeatedly penetrate with said beam energy successive paths in a selected plane through the object, means for changing at a relatively slow rate the relative positions in said plane of the surface of the object and of said transducer means whereby compound scanning of the object is effected, means connected to said transducer means for receiving echoes from ultrasonic energy reflecting parts of the object within said plane, means utilizing said received echoes for producing a representation of the respective parts of the object in their relative positions, and means synchronized with the changes in the relative positions of the object and said transducer for coordinating the representations of the parts of the object in all said positions whereby the successive representations may be superposed to produce a composite representation of the object in said plane.

11. In an ultrasonic apparatus for examining the physical characteristics of bodies of matter, means including an electroacoustic transducer for generating a concentrated beam of ultrasonic wave energy, means for positioning an object to be examined in the path of the beam, means for conducting the ultrasonic energy from said transducer to the object to be examined, means for moving the beam back and forth across the object to be examined for sweeping a zone of the object with the beam penetrating the object along successive laterally spaced paths, means for changing the relative angular positions of said transducer and the object whereby said transducer may be operated to sweep the beam through said zone of the object in successive different angular positions, means connected to said generating means for receiving echoes from ultrasonic energy reflecting parts of the object within said field, means utilizing said received echoes for producing a representation of the respective parts of the object in their relative positions, and means synchronized with the changes in the relative angular positions of the object and said transducer for coordinating the representations of the respective parts of the object in all angular positions whereby the successive representations may be superposed to produce a composite representation of the object in said field.

12. The method of forming an image representing substantially a cross section of a body of matter which comprises the steps of directing a beam of ultrasonic energy through the body, sweeping the beam laterally back and forth across the body in a selected zone thereof, changing the relative angular positions of the beam and of the body progressively to effect said sweeping of the selected zone of the body from successive different angular positions, receiving echoes from ultrasonic energy reflecting parts of the body within the zone, utilizing the received echoes for producing representations of said parts of the body in their respective relative positions corresponding to their locations in the zone of the body from which the echoes are received, coordinating the images corresponding to echoes received from successive different angular positions of the body in accordance with the change in angular position, and superposing the representations of the respective reflecting parts of the body in successive different angular positions of the body and the beam to form a composite representation of the selected zone of the body.

References Cited in the file of this patent

UNITED STATES PATENTS

| | | |
|---|---|---|
| 2,593,865 | Erdman | Apr. 22, 1952 |
| 2,751,783 | Erdman | June 26, 1956 |

FOREIGN PATENTS

| | | |
|---|---|---|
| 696,920 | Great Britain | Sept. 9, 1953 |